(12) United States Patent
Tsumori

(10) Patent No.: US 9,376,970 B2
(45) Date of Patent: Jun. 28, 2016

(54) VEHICLE CONTROL DEVICE

(75) Inventor: Chika Tsumori, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 230 days.

(21) Appl. No.: 14/004,093

(22) PCT Filed: Mar. 10, 2011

(86) PCT No.: PCT/JP2011/055707
§ 371 (c)(1),
(2), (4) Date: Sep. 9, 2013

(87) PCT Pub. No.: WO2012/120688
PCT Pub. Date: Sep. 13, 2012

(65) Prior Publication Data
US 2013/0345952 A1    Dec. 26, 2013

(51) Int. Cl.
*F02D 29/02* (2006.01)
*F02N 11/08* (2006.01)

(52) U.S. Cl.
CPC ............ *F02D 29/02* (2013.01); *F02N 11/0818* (2013.01); *F02N 11/0837* (2013.01); *F02N 2200/123* (2013.01); *F02N 2200/14* (2013.01); *Y02T 10/48* (2013.01)

(58) Field of Classification Search
CPC ....... F02D 29/02; F02D 41/042; F02D 41/06; F02D 41/062; F02D 41/065; F02N 11/0818; F02N 11/0837; F02N 2200/11; Y02T 10/44; Y02T 10/48

USPC ............... 701/101–104, 112–114; 123/179.3, 123/179.4, 179.14, 179.17, 299, 198 DB
See application file for complete search history.

(56) References Cited

U.S. PATENT DOCUMENTS

| | | | |
|---|---|---|---|
| 8,423,271 B2* | 4/2013 | Gibson et al. ................. | 701/112 |
| 2006/0200292 A1 | 9/2006 | Asakage | |
| 2012/0109503 A1* | 5/2012 | Yang et al. .................... | 701/113 |
| 2013/0018569 A1* | 1/2013 | Sangameswaran et al. .. | 701/112 |
| 2013/0131966 A1* | 5/2013 | Hirano .......................... | 701/112 |
| 2013/0166185 A1* | 6/2013 | Ando ............................ | 701/112 |

FOREIGN PATENT DOCUMENTS

| | | |
|---|---|---|
| DE | 102007024352 A1 | 11/2008 |
| JP | A-2001-200750 | 7/2001 |
| JP | A-2001-263210 | 9/2001 |
| JP | A-2004-251278 | 9/2004 |
| JP | A-2010-281237 | 12/2010 |

* cited by examiner

*Primary Examiner* — John Kwon
*Assistant Examiner* — Johnny H Hoang
(74) *Attorney, Agent, or Firm* — Oliff PLC

(57) ABSTRACT

In a vehicle control device for performing control to stop and start an engine according to a traveling state of a vehicle regardless of an operation of stopping and starting the engine by a driver, the stopping of the engine is limited based on a starting endurance ability of the engine. Thus, an endurance number of years of a starter can be ensured. If a contribution degree in improving a fuel economy by the stopping of the engine at the time of parking is high, the effect of improving the fuel economy can be suppressed from reducing by prohibiting the automatic stopping of the engine 4 during traveling. The effect of improving the fuel economy by stopping the engine can be enhanced by ensuring the endurance number of years of the starter.

3 Claims, 8 Drawing Sheets

VEHICLE CONTROL DEVICE

FIELD

The present invention relates to a vehicle control device.

BACKGROUND

In vehicles of recent years, a control technique of enabling the vehicle to travel with inertia with the engine stopped, or to stop the engine when temporarily stopping the vehicle is being developed if a request for a driving force is not made by a driver during traveling of the vehicle in an aim to improve fuel economy, to reduce the emission amount of the exhaust gas, and the like. In this case, a starter, which is an engine starting device, is driven to start the engine without the driver carrying out the starting operation of the engine when a predetermined condition is satisfied with the engine stopped.

However, when performing control to stop the engine during traveling of the vehicle, the usage frequency of the starter becomes high and the endurance of the starter tends to lower easily, and thus the control of the vehicle is differed according to the usage state of the starter in some conventional vehicles. For example, in an electronic control device described in Patent Literature 1, a driving time of the starter is accumulated, and the control to stop the engine is prohibited when the accumulated driving time reaches a predetermined time to suppress damages of the starter and the gears.

CITATION LIST

Patent Literature

Patent Literature 1: Japanese Patent Application Laid-open No. 2001-263210

SUMMARY

Technical Problem

However, in a vehicle in which the control to stop the engine is performed during the traveling, the effects such as improvement of the fuel economy, and the like lower if the control to stop the engine is prohibited to suppress the damages of the starter, and the like. Thus, it is very difficult to satisfy both the effect of stopping the engine and the endurance of the starter.

In light of the foregoing, it is an object of the present invention to provide a vehicle control device capable of satisfying both reduction in fuel economy and ensuring of the endurance of the engine starting device.

Solution to Problem

In order to solve the above mentioned problem and achieve the object, in a vehicle control device according to the present invention that performs control to stop and start an engine according to a traveling state of a vehicle regardless of an operation of stopping and starting the engine by a driver, the stopping of the engine is limited based on a starting endurance ability of the engine.

Further, in the vehicle control device, it is preferable that the starting endurance ability of the engine is defined based on an endurance number of years of the engine, a starting number of times of the engine, or a used time of the engine.

Further, in the vehicle control device, it is preferable that when limiting the stopping of the engine, one of either stopping of the engine while the vehicle is traveling or stopping of the engine while the vehicle is stopped is limited.

Further, in the vehicle control device, it is preferable that when limiting the stopping of the engine, either stopping of the engine while the vehicle is traveling or stopping of the engine while the vehicle is stopped in which an effect of reducing fuel is lower is limited.

Further, in the vehicle control device, it is preferable that when limiting the stopping of the engine, either stopping of the engine while the vehicle is traveling or stopping of the engine while the vehicle is stopped in which an effect of reducing fuel is lower is limited on a road on which the vehicle is scheduled to travel.

Further, in the vehicle control device, it is preferable that when limiting the stopping of the engine, either stopping of the engine while the vehicle is traveling or stopping of the engine while the vehicle is stopped in which a stopped time of the engine is shorter is limited.

Advantageous Effects of Invention

The vehicle control device according to the present invention has an effect of being able to satisfy both reduction in fuel economy and ensuring of the endurance of the engine starting device.

DESCRIPTION OF EMBODIMENTS

Embodiments of a vehicle control device according to the present invention will be hereinafter described in detail based on the drawings. It should be noted that the present invention is not limited by the embodiments. Furthermore, the configuring elements in the embodiments described below include elements that can be easily replaced by those skilled in the art and that are substantially the same.

[First Embodiment]

Figure 1:
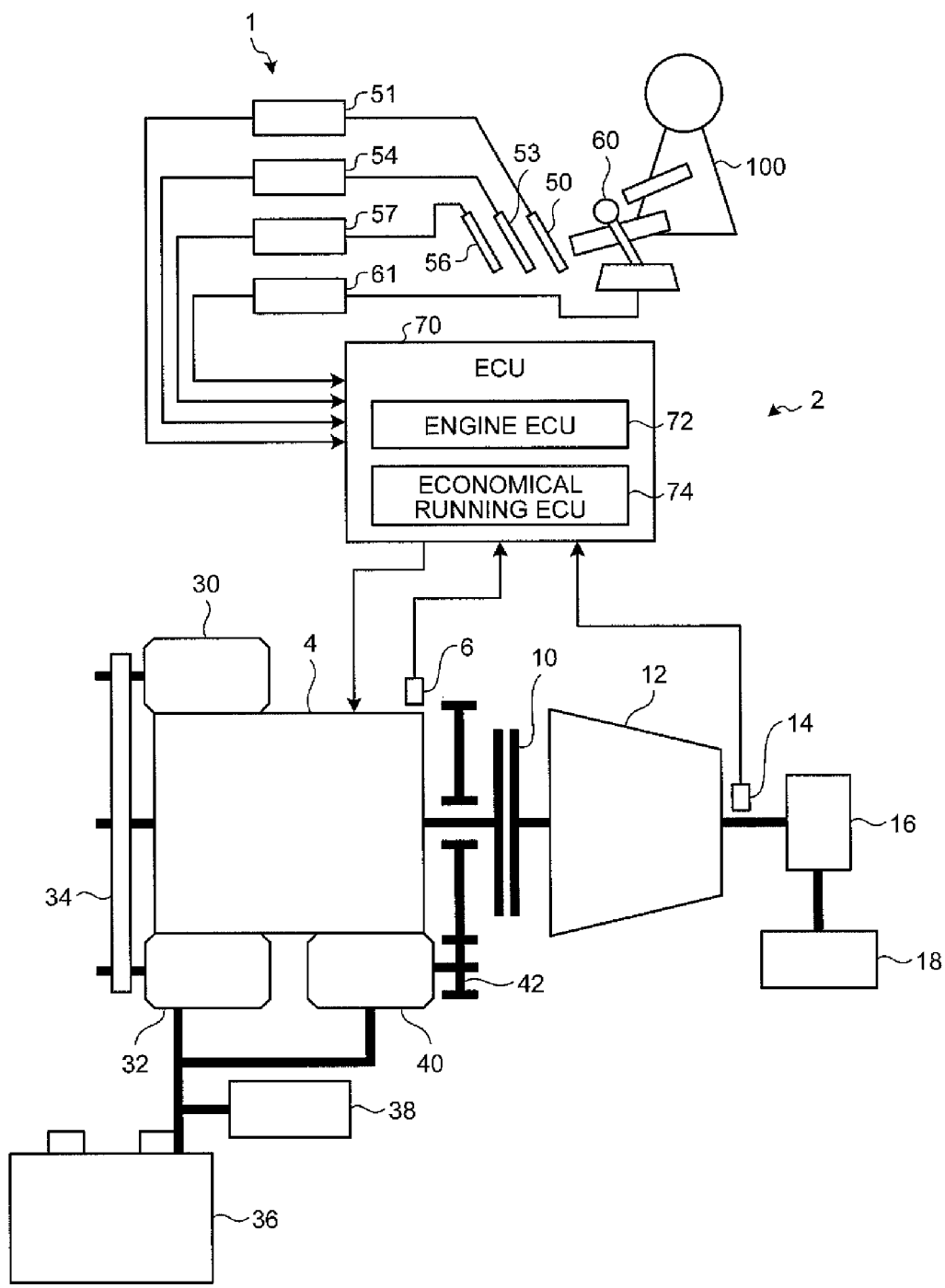
FIG. 1 is a schematic view of a vehicle including a vehicle control device according to a first embodiment.

FIG. 1 is a schematic diagram of a vehicle including a vehicle control device according to a first embodiment. As illustrated in the figure, a vehicle 1 including a vehicle control device 2 according to the first embodiment includes an engine 4, which is an internal combustion engine, as a power source in traveling, where the engine 4 is coupled to a stepped variable transmission 12 by way of a clutch 10. The transmission 12 is also connected to a final decelerator 16 by way of a power transmission path, and such final decelerator 16 is coupled to a drive wheel 18 by way of a drive shaft.

The engine 4 includes an engine revolution number sensor 6, which is a revolution number detecting means, for detecting the engine revolution number, so that the revolution number at the time of the operation of the engine 4 can be detected. The transmission 12 also includes a vehicle speed sensor 14, which is a vehicle speed detecting means, for detecting the vehicle speed through the detection of a revolution speed of a rotating body on an output side of an output shaft, and the like.

The engine 4 further includes an auxiliary machine 30 such as a compressor for an air conditioner, and the like, and an alternator 32, which is a power generator, where the auxiliary machine 30 and the alternator 32 can be driven with the power of the engine 4 transmitted through a pulley (not illustrated) and a transmission belt 34. The alternator 32 is arranged as a power source of an electrical device used in the vehicle 1, and is connected with a battery 36 that can be charged and discharged. A BBC (Backup Boost Converter) 38, which is a voltage compensating means, for boosting the voltage and supplying power to each electrical device when the output voltage from the battery 36 is lowered is connected between the battery 36 and the alternator 32.

Furthermore, the engine 4 includes a starter 40, which is an engine starting device, capable of starting the engine 4 by inputting a revolution torque to a crankshaft (not illustrated) of the engine 4 when the engine 4 is stopped. The starter 40 is connected to the battery 36 and the alternator 32, and can be driven by electricity supplied therefrom. The power generated in the starter 40 can be transmitted to the crankshaft of the engine 4 via a power transmission mechanism 42, and the engine 4 can be started by rotating the stopped crankshaft with the power generated in the starter 40.

An acceleration pedal 50, which is an acceleration operator, capable of adjusting the power generated in the engine 4 and being operated when adjusting the driving force, a brake pedal 53, which is a braking operator, operated when generating a braking force in a brake device (not illustrated) of the vehicle 1, and a clutch pedal 56, which is a clutch operator, for operating a connection state of the clutch 10 by switching between a joint state and a released state of the clutch 10 are arranged in the vicinity of a driver's seat of the vehicle 1. Furthermore, a shift lever 60 capable of selecting one of a plurality of gear change stages of the transmission 12, and also capable of selecting a neutral position at which none of the gear change stages are selected is also arranged in the vicinity of the driver's seat.

The operation states of the pedals and the shift lever 60 arranged in the above manner can be respectively detected by a driving operation detecting means. Specifically, the operation state of the acceleration pedal 50 can be detected with an acceleration sensor 51, the operation state of the brake pedal 53 can be detected with a brake sensor 54, and the operation state of the clutch pedal 56 can be detected with a clutch sensor 57. Similarly, the shift lever 60 is arranged such that the operation state of the shift lever 60, that is, the selected state of the gear change stage or the neutral position of the transmission 12 selected with the shift lever 60 can be detected with a shift sensor 61.

The machines and devices such as the engine 4, and the like arranged in the above manner are mounted on the vehicle 1 and are connected to an ECU (Electronic Control Unit) 70 for controlling each unit of the vehicle 1. Similarly, the sensors such as the engine revolution number sensor 6, the vehicle speed sensor 14, the acceleration sensor 51, the brake sensor 54, the clutch sensor 57, the shift sensor 61, and the like are also connected to the ECU 70. The ECU 70, to which the devices and sensors are connected, can exchange information and signals with such devices, and the like, so that each unit of the vehicle 1 is operated by being controlled by the ECU 70 based on the detection results of the sensors.

Therefore, an engine ECU 72 for performing the control of the engine 4, and an economical running ECU 74 for performing the control of the economical running, which is the control for stopping or starting the engine 4 when a predetermined condition is satisfied during traveling of the vehicle 1 are arranged for the ECU 70 capable of controlling each unit. The engine ECU 72 performs the control of the engine 4 by controlling the intake air amount of the engine 4, as well as the fuel injection amount and the ignition timing by an injector (not illustrated) according to the opening of the acceleration pedal 50 detected with the acceleration sensor 51, the engine revolution number detected with the engine revolution number sensor 6, the engine cooling water temperature, and the like. The economical running ECU 74 performs the control of stopping the engine 4 when a predetermined stopping condition is satisfied during traveling or parking of the vehicle 1, and starting the engine 4 when a predetermined starting condition is satisfied while the engine 4 is stopped. In other words, the economical running ECU 74 performs the control of stopping and starting the engine 4 according to the traveling state of the vehicle 1 regardless of the operation of stopping and starting the engine 4 by a driver 100.

A hardware configuration of the ECU 70 capable of controlling each unit has a known configuration including a processing unit with a CPU (Central Processing Unit), and the like, a storage unit such as RAM (Random Access Memory), and the like, and thus the description will be omitted.

The vehicle control device 2 according to the first embodiment has the configuration described above, and now the operation thereof will be described below. At the time of traveling of the vehicle 1, the acceleration opening, which is the operation amount of the acceleration pedal 50 operated by the driver 100, is detected with the acceleration sensor 51, and the detection result is acquired by the engine ECU 72.

The engine ECU 72 performs the control of the engine 4 on the basis of the acceleration opening detected with the acceleration sensor 51 and the traveling state of the vehicle 1 detected with other sensors so that the power requested by the driver 100 can be generated in the engine 4. In this case, the engine ECU 72 performs drive control while detecting the operation state of the engine 4 based on the detection result of the engine revolution number sensor 6, and the like. The power generated in the engine 4 is transmitted to the drive wheel 18 through the transmission 12 and the final decelerator 16, thus generating the driving force at the drive wheel 18.

At the time of traveling of the vehicle 1, the gear change stage of the transmission 12 is switched so that the change gear ratio of the transmission 12 becomes the change gear ratio suited to the vehicle speed, where such switching of the gear change stage is carried out by having the driver 100 operate the shift lever 60 to select the arbitrary gear change stage.

When carrying out the gear changing operation during traveling of the vehicle 1, the driver 100 depresses the clutch pedal 56 to have the clutch 10 in a disconnected state, and operates the shift lever 60 with the transmission of torque between the engine 4 and the transmission 12 shielded. After the gear changing operation is completed, the clutch pedal 56 is returned so that the change gear ratio with respect to the revolution number of the engine 4 is changed between before and after the gear change, and the power generated in the engine 4 is transmitted to the drive wheel 18. When the driver 100 performs such driving operation, the vehicle 1 travels while generating the driving force requested by the driver 100.

The vehicle control device 2 according to the first embodiment can perform so-called economical running control, which is control for carrying out automatic stopping and automatic starting of the engine 4 according to the traveling state of the vehicle 1 and the state of the driving operation of the driver 100. The automatic stopping and automatic starting in the economical running control are carried out when determined by the economical running ECU 74 that the state of the driving operation of the driver 100 and the operation state of the engine 4 satisfy a predetermined condition.

Describing first the automatic stopping out of the automatic stopping and the automatic starting, the operation of the engine is stopped if determined that the driver 100 is not requesting for a driving force, that is, if the condition for automatic stopping of the engine 4 is satisfied. Specifically, the driver 100 depresses the clutch pedal 56 to disconnect the clutch 10 and then operates the shift lever 60 to the neutral position in accordance with the detection results of the clutch sensor 57 and the shift sensor 61 during traveling of the vehicle 1, where the economical running ECU 74 determines to perform the automatic stopping when re-connection of the clutch 10 is detected. That is, when the driver 100 operates the shift lever 60 to the neutral position, determination is made that the driver 100 is not requesting for a driving force and determination of automatic stopping is made.

Alternatively, even when the driver 100 does not disconnect the clutch 10, the economical running ECU 74 can determine to perform the economical running if the shift lever 60 is operated to the neutral position, and the revolution number of the engine 4 detected by the engine revolution number sensor 6 is detected to be smaller than or equal to a predetermined revolution number, which is set in advance as the revolution number to use for the determination of the economical running and stored in a storage unit of the economical running ECU 74. That is, even if the driver 100 operates the shift lever 60 to the neutral position without depressing the clutch pedal 56, this is an expression of will that the driver 100 actively operates the shift lever 60 to the neutral position, and hence determination is made that the driver 100 is not requesting for a driving force and determination of automatic stopping is made.

When detected that the driver 100 disconnected the clutch 10, the economical running ECU 74 determines to perform the automatic stopping when detecting that the engine revolution number is smaller than or equal to a predetermined revolution number even if the shift lever 60 is not operated to the neutral position. That is, if the driver 100 continuously depresses the clutch pedal 56 so that the engine revolution number is lowered to the predetermined revolution number without operating the shift lever 60 to the neutral position, determination is made that the driver 100 is not requesting for a driving force and the determination of automatic stopping is made.

In other words, the economical running ECU 74 determines to perform the automatic stopping when the disconnected state of the clutch 10 is detected by the clutch sensor 57 and when the transmission 12 is detected to be at the neutral position by the shift sensor 61, when the transmission 12 is detected to be at the neutral position by the shift sensor 61 and the revolution number detected by the engine revolution number sensor 6 is smaller than or equal to a predetermined revolution number set in advance, or when the disconnected state of the clutch 10 is detected by the clutch sensor 57 and the revolution number detected by the engine revolution number sensor 6 is smaller than or equal to the predetermined revolution number set in advance, during traveling of the vehicle 1.

If determined by the economical running ECU 74 to perform the automatic stopping of the engine 4 during traveling of the vehicle 1 when the predetermined conditions are met, a control signal notifying the same is transmitted to the engine ECU 72. The engine ECU 72 that received the control signal stops the fuel injection control and the ignition control to stop the operation of the engine 4 and to perform the control of traveling through inertia. In this case, the transmission 12 is at the neutral position or the clutch 10 is in the disconnected state, and hence the transmission of torque is shielded between the drive wheel 18 and the engine 4. Accordingly, the vehicle 1 continues to travel through inertia by the kinetic energy based on the vehicle speed of when the automatic stopping started.

The automatic stopping in the economical running control is also carried out while the vehicle 1 is stopped. Specifically, when the vehicle speed detected by the vehicle speed sensor 14 is zero and the shift lever 60 is at the neutral position, and furthermore, when the clutch 10 is in the joined state, that is, in a state the clutch pedal 56 is returned, determination is made to perform the automatic stopping. When determined by the economical running ECU 74 that the operation states acquired by the sensors satisfy the conditions for automatic stopping, the stopping control of the engine 4 in which fuel cutting of the engine 4, and the like are carried out, is performed by the engine ECU 72 to automatically stop the engine 4.

When the vehicle 1 satisfies the conditions for automatic stopping, the engine 4 is stopped in the above manner to reduce the fuel consumption amount and to reduce the emission amount of the exhaust gas. However, if the driver 100 performs the driving operation in which determination can be made that the driver 100 is requesting for a driving force is carried out with the engine 4 stopped, the engine 4 is restarted. In restarting the engine 4, the engine 4 is started according to the operation mode of when joining the clutch 10 by the operation of the clutch pedal 56 at the time of stopping of the engine 4.

Describing the automatic starting of the engine 4 in more detail, the economical running ECU 74 continuously acquires the operation state of the vehicle 1 such as the state of the driving operation by the driver 100 based on the detection results of the sensors even in a state the engine 4 is stopped. The economical running ECU 74 determines whether or not the driver 100 is requesting for a driving force based on the operation state of the vehicle 1 acquired in such manner, and makes the determination to execute the automatic starting of the engine 4 if determination can be made that the driver 100 is requesting for a driving force.

The condition of when performing the automatic starting of the engine 4 includes, for example, that the clutch pedal 56 is depressed, the shift lever 60 is in a state other than the neutral position and the like. If determined by the economical running ECU 74 that the operation states detected with the sensors satisfy the conditions for the automatic starting, the starter 40 is activated by the economical running ECU 74 to start the engine 4.

During traveling of the vehicle 1, the fuel economy is improved, the emission amount of the exhaust gas is reduced, and the like by carrying out the economical running in the above manner when the predetermined conditions are satisfied. However, the driving number of times of the starter 40 increases since the stopping and the starting of the engine 4 are repeated in the economical running control. Thus, the economical running control is performed in view of protecting the starter 40 in the vehicle control device 2 according to the first embodiment.

Figure 2:
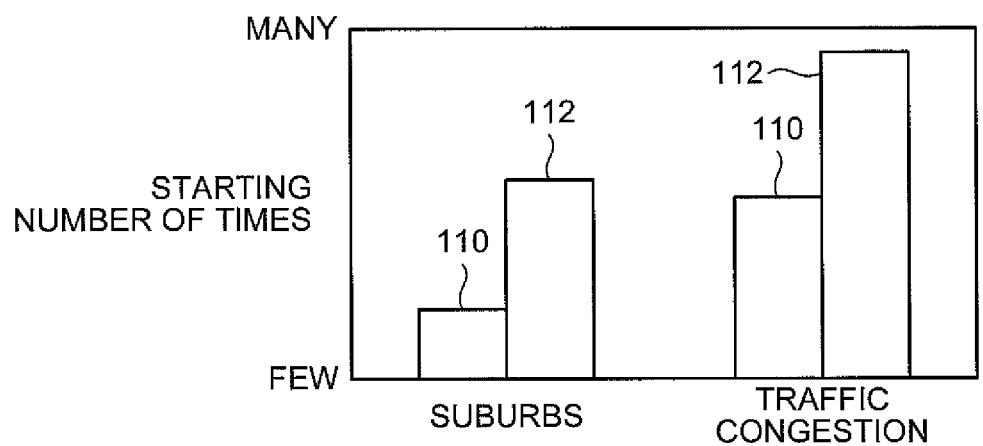
FIG. 2 is a comparison diagram illustrating an example of a stopped state of an engine for the suburbs and for an environment of heavy traffic congestion.

FIG. 2 is a comparison diagram illustrating an example of a stopped state of the engine for the suburbs and for the environment of heavy traffic congestion. Describing the starting number of times of the engine 4 in the economical running control for stopping the engine 4 not only while the vehicle 1 is parked but also during traveling, the starting number of times of the engine 4 during traveling of the vehicle 1 tends to be greater in a traveling environment in which the vehicle 1 can smoothly travel rather than in a traveling environment where parking is carried out many times. For example, the results illustrated in FIG. 2 are obtained by comparing the starting number of times of the engine 4 while the vehicle 1 is parked and the starting number of times of the engine 4 during traveling for the suburbs, which is an environment where the vehicle can travel relatively smoothly, and for the traffic, which is an environment where the vehicle travels while frequently repeating start and stop. In other words, in the example illustrated in FIG. 2, a travel engine starting number of times 112 is about twice a park engine starting number of times 110 during traffic congestion, whereas the travel engine starting number of times 112 is about three times the park engine starting number of times 110 in the suburbs.

Figure 3:
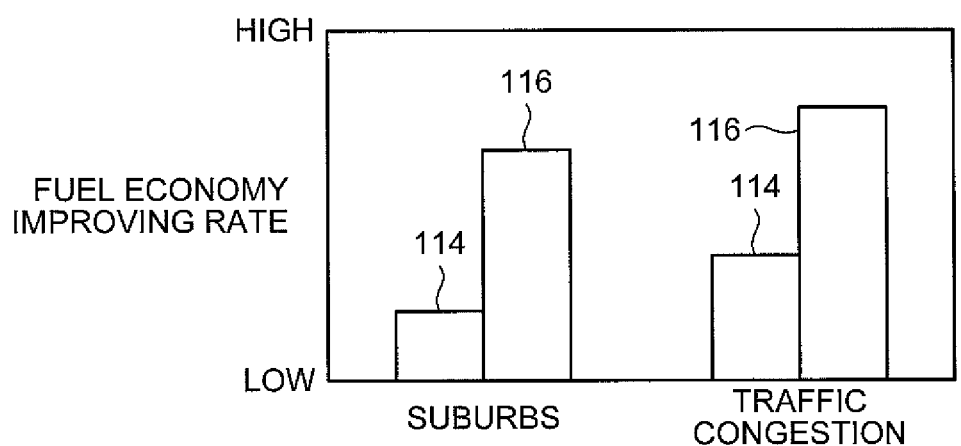
FIG. 3 is a comparison diagram illustrating the fuel economy improving rate of when the control to stop the engine is performed in the suburbs and in the environment of traffic congestion.

FIG. 3 is a comparison diagram illustrating the fuel economy improving rate of when the control to stop the engine is performed in the suburbs and in the environment of heavy traffic congestion. The starting number of times of the engine 4, that is, the stopping number of times of the engine 4 differ between the suburbs and during traffic, and thus the fuel economy improving rate involved in the stopping of the engine 4 also differs, where the proportion of a traveling fuel economy improving rate 116 with respect to a parking fuel economy improving rate 114 in the suburbs is greater than a proportion of the traveling fuel economy improving rate 116 with respect to the parking fuel economy improving rate 114 during the traffic. In other words, the parking fuel economy improving rate 114 has greater contribution degree with respect to the entire fuel economy during the traffic congestion than in the suburbs. The contribution degree in improving the fuel economy by the stopping of the engine 4 during parking becomes large when performing the stopping control of the engine 4 during the traffic congestion, and the contribution degree in improving the fuel economy by the stopping of the engine 4 during traveling tends to easily become large when performing the stopping control of the engine 4 in the suburbs.

When performing the control to stop the engine 4 during traveling of the vehicle 1, if the driving time of the starter 40 is integrated or the driving number of times is counted to ensure endurance of the starter 40, these are added regardless of the traveling state of the vehicle 1. Thus, in the case of the vehicle 1 in which the engine 4 is often stopped by the economical running control while traveling through traffic, the driving time or the driving number of times of the starter 40 involved in the stopping of the engine 4 during traveling in which the contribution degree in improving the fuel economy by the stopping of the engine 4 is low are counted. In this case, when the driving number of times of the starter 40 reaches a predetermined number of times, the stopping control of the engine 4 by the economical running is thereafter prohibited, so that the effect of improving the fuel economy may possibility become higher.

Thus, in the vehicle control device 2 according to the first embodiment, a state of performing automatic stopping and automatic starting by the economical running control is learned, and the conditions for automatic stopping of the engine 4 are changed in accordance with the traveling state of the vehicle 1. Specifically, when stopping the engine 4 by the economical running control, the stopping time of the engine 4 for while traveling and for while parking of the vehicle 1 is integrated, and the fuel reduced by stopping the engine 4 is calculated. Determination is made that the contribution degree in improving the fuel economy by stopping the engine 4 at the time of parking is high if the reduction amount of when the engine 4 is stopped while parking is greater than or equal to about 1.2 times the reduction amount of when the engine 4 is stopped while the vehicle 1 is traveling among the calculated reduction amount of the fuel.

Furthermore, if determined that the contribution degree in improving the fuel economy by stopping the engine at the time of parking is high, the automatic stopping of the engine 4 during traveling of the vehicle 1 is limited based on the starting number of times and the used number of years of the engine 4. That is, the automatic stopping of the engine 4 during traveling of the vehicle 1 in which the effect of fuel reduction is low is limited among the automatic stopping of the engine for while traveling and for while parking of the vehicle 1.

Figure 4:
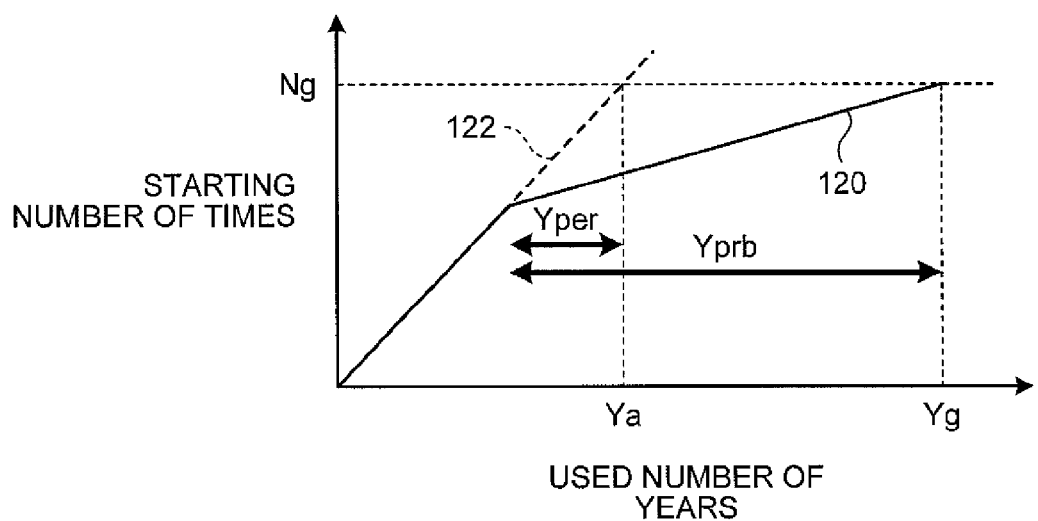
FIG. 4 is an explanatory view illustrating a relationship between the starting number of times and the used number of years of the engine.

FIG. 4 is an explanatory view illustrating a relationship between the starting number of times and the used number of years of the engine. When limiting the automatic stopping of the engine 4, that is, when prohibiting the automatic stopping during traveling of the vehicle 1, a guaranteed number of years Yg, which is the number of years in which the normal operation of the starter 40 is to be ensured, is first predicted from the traveling distance of the vehicle 1 and the starting number of times of the engine 4. In order to maintain such guaranteed number of years Yg, from how many years the automatic stopping of the engine 4 during traveling of the vehicle 1 is to be prohibited is calculated. The guaranteed number of years Yg is the number of years indicating the starting endurance ability of the engine 4, and hence the stopping of the engine 4 is limited based on the starting endurance ability of the engine 4 by calculating the period of prohibiting the automatic stopping of the engine 4 on the basis of the guaranteed number of years Yg.

Specifically, when prohibiting the automatic stopping of the engine 4 during traveling of the vehicle 1, the starting number of times of the starter 40 of when the economical running control is performed in the current traveling state of the vehicle 1 and a guaranteed number of times Ng, which is the number of times in which the normal operation of the starter 40 can be ensured, are compared. The automatic stopping of the engine 4 during traveling of the vehicle 1 is prohibited if determined that the number of years Ya for a stop permitting starting number of times 122, which is the starting number of times of the starter 40 of when the economical running control is performed in the current traveling state of the vehicle 1, to reach the guaranteed number of times Ng is shorter than the guaranteed number of years Yg according to such comparison. The starting number of times of the engine 4 thus can be reduced, and hence the number of years for a stop prohibiting starting number of times 120, which is the starting number of times of when the automatic stopping of the engine 4 during traveling of the vehicle 1 is prohibited, to reach the guaranteed number of times Ng reaches the guaranteed number of years Yg.

In other words, a stop prohibiting used number of years Yprb, which is the number of years from when the automatic stopping of the engine 4 during traveling of the vehicle 1 is prohibited until the starting number of times of the engine 4 reaches the guaranteed number of times Ng, becomes longer than a stop permitting used number of years Yper, which is the number of years until reaching the guaranteed number of times Ng without prohibiting the automatic stopping of the engine 4 during traveling. In this case, the automatic stopping of the engine 4 by the economical running control is performed only during parking, but the fuel economy can be improved in total since the contribution degree in improving the fuel economy by stopping the engine 4 at the time of parking is determined to be high.

Figure 5:
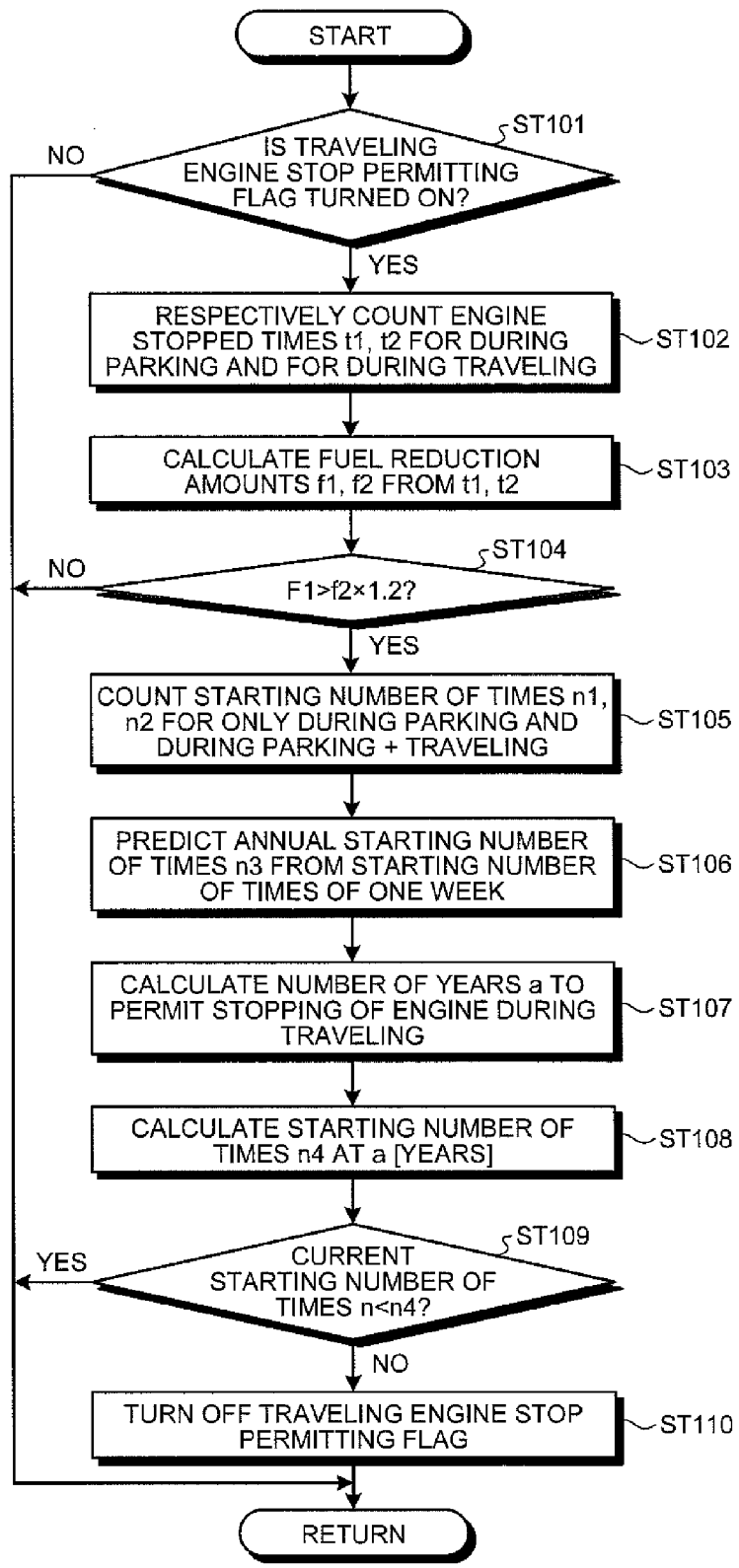
FIG. 5 is a flowchart illustrating an outline of a processing procedure of the vehicle control device according to the first embodiment.

FIG. 5 is a flowchart illustrating an outline of a processing procedure of the vehicle control device according to the first embodiment. The summary of the processing procedure in determining the state of carrying out the automatic stopping of the engine 4 when performing the economical running control in the vehicle control device 2 according to the first embodiment will now be described.

In determining the stopped state of the engine 4, whether or not a traveling engine stop permitting flag is turned ON is first determined (step ST101). This traveling engine stop permitting flag is set in the economical running ECU 74 as a flag indicating whether or not to permit the automatic stopping of the engine 4 by the economical running control during traveling of the vehicle 1. The traveling engine stop permitting flag is switched to ON when permitting the automatic stopping of the engine 4 during traveling, and is switched to OFF when prohibiting the automatic stopping of the engine 4 during traveling.

If determined that the traveling engine stop permitting flag is not turned ON according to the determination (step ST101, determination of No), that is, if determined that the traveling engine stop permitting flag is turned OFF, the process exits from the processing procedure.

If, on the other hand, determined that the traveling engine stop permitting flag is turned ON (step ST101, determination of Yes), engine stopped times t1, t2 for during parking and for during traveling are respectively counted (step ST102). That is, since the traveling engine stop permitting flag is turned ON, the vehicle 1 stops the engine 4 in both cases of during parking and during traveling by the economical running control if the predetermined conditions are satisfied, where the stopped time is measured by the economical running ECU 74 when the engine 4 is stopped. In other words, the time t1 in which the engine 4 is stopped during parking and the time t2 in which the engine 4 is stopped during traveling of the vehicle 1 are respectively counted.

Fuel reduction amounts f1, f2 are then calculated from t1, t2 (step ST103). That is, when the engine 4 is stopped, the fuel consumption amount reduces by such amount, and hence the reduction amounts f1, f2 of the fuel are calculated based on the stopped times t1, t2 of the engine 4. This calculation is carried out by calculating, in advance, the fuel calculation amount per one second at the time of idling of the engine 4, and multiplying such fuel consumption amount and the stopped times t1, t2 of the engine 4. The fuel reduction amount f1 obtained by stopping the engine 4 during parking, and the fuel reduction amount f2 obtained by stopping the engine 4 during traveling are thereby calculated.

Next, whether or not {fuel reduction amount f1 during parking>(fuel reduction amount f2 during traveling ×1.2)} is determined (step ST104). In other words, whether or not the fuel reduction amount f1 during parking is greater than 1.2 times the fuel reduction amount f2 during traveling is determined. If determined that the fuel reduction amount f1 during parking is smaller than or equal to 1.2 times the fuel reduction amount f2 during traveling, the process exits from the processing procedure.

On the other hand, if determined that the fuel reduction amount f1 during parking is greater than 1.2 times the fuel reduction amount f2 during traveling, a starting number of times n1 for only during parking and a starting number of times n2 for during parking +traveling are respectively counted (step ST105). That is, in the economical running control, the starter 40 is driven when the predetermined conditions are satisfied to perform the automatic starting of the engine 4 after performing the automatic stopping of the engine 4, where the starting number of times of when starting the engine 4 by automatic starting is counted by the economical running ECU 74. In this case, the starting number times n1 by the automatic starting during parking, and the number of times n2 in which the starting number of times by the automatic starting during parking and the starting number of times by the automatic starting during traveling are added, are respectively counted.

An annual starting number of times n3 is predicted from the starting number of times of one week (step ST106). In other words, the starting number of times n3 of one year is predicted based on the number of times for one week of the starting number of times n2 for during parking+traveling.

The number of years a to permit the stopping of the engine 4 during traveling of the vehicle 1 is then calculated (step ST107). This calculation is carried out based on a simultaneous equation of equation (1) and equation (2) below. In equation (1) and equation (2) described below, a is the number of years to permit the stopping of the engine 4 during traveling of the vehicle 1, that is, the number of years to permit the automatic stopping of the engine 4 during parking and the automatic stopping of the engine 4 during traveling. Furthermore, b is a number of years to prohibit the automatic stopping of the engine 4 during traveling, and permit only the automatic stopping of the engine 4 during parking.

$$\text{Guaranteed number of years in current state} = a + b \quad (1)$$

$$\text{Guaranteed number of years in current state} = a \times n2 + b \times n1 \quad (2)$$

Next, a starting number of times n4 at the time of a [years] is calculated (step ST108). In other words, the number of years a calculated in step ST107 and the starting number of times n3 of one year calculated in step ST106 are multiplied to calculate the starting number of times n4 at the time of a [years]

Whether or not the current starting number of times n<n4 is then determined (step ST109). While the vehicle 1 is traveling, the number of times n of the automatic starting of the engine 4 by the economical running control is counted by the economical running ECU 74, and whether or not the current number of times n of the automatic starting is smaller than the starting number of times n4 at the time of a [years] is determined. If determined that the current number of times n of the automatic starting is smaller than the starting number of times n4 at the time of a [years] (step ST109, determination of Yes), the process exits from the processing procedure.

If determined that the current number of times n of the automatic starting is greater than the starting number of times n4 at the time of a [years] (step ST109, determination of No), the traveling engine stop permitting flag is turned Off (step ST110). The automatic stopping of the engine 4 by the economical running control during traveling of the vehicle 1 is thereby prohibited, and hence the number of times of the automatic starting reduces, and the usage frequency of the starter 40 reduces.

The vehicle control device 2 described above prohibits the automatic stopping of the engine 4 during traveling of the vehicle 1 on the basis of the guaranteed number of years Yg indicating the starting endurance ability of the engine 4 when performing the control of the economical running, and thus the endurance number of years of the starter 40 can be ensured. If the contribution degree in improving the fuel economy by stopping the engine at the time of parking is high, the effect of improving the fuel economy can be suppressed from lowering by prohibiting the automatic stopping of the engine 4 during traveling. Furthermore, the effect of improving the fuel economy by stopping the engine 4 can be increased by ensuring the endurance number of years of the starter 40. As a result, both the reduction of fuel economy and ensuring of endurance of the starter 40 can be achieved.

When prohibiting the automatic stopping of the engine 4 by the economical running control, only the automatic stopping during traveling out of the automatic stopping of the engine 4 during traveling of the vehicle 1 and the automatic stopping of the engine 4 during parking is prohibited so that the effect of improving the fuel economy can be ensured even when limiting the automatic stopping of the engine 4 and ensuring the endurance number of years of the starter 40. As a result, the effect of reducing the fuel economy can be more reliably maintained while ensuring the endurance of the starter 40.

When prohibiting the automatic stopping of the engine 4 by the economical running control, the automatic stopping of the engine 4 during traveling of the vehicle 1, which is the automatic stopping in which the effect of reducing the fuel is lower, is prohibited, so that the effect of improving the fuel economy can be more reliably ensured. As a result, the effect of reducing the fuel economy can be more reliably maintained while ensuring the endurance of the starter 40.

[Second Embodiment]

The vehicle control device 2 according to a second embodiment has a configuration substantially similar to the vehicle control device 2 according to the first embodiment, but has a characteristic in learning the stopped state of the engine 4 on a road on which the vehicle 1 travels, and performing the calculation in view of the learnt content when calculating the timing to prohibit the automatic stopping of the engine 4 during traveling of the vehicle 1. Other configurations are similar to the first embodiment, and thus the description thereof will be omitted and the same reference numerals will be denoted.

Figure 6:
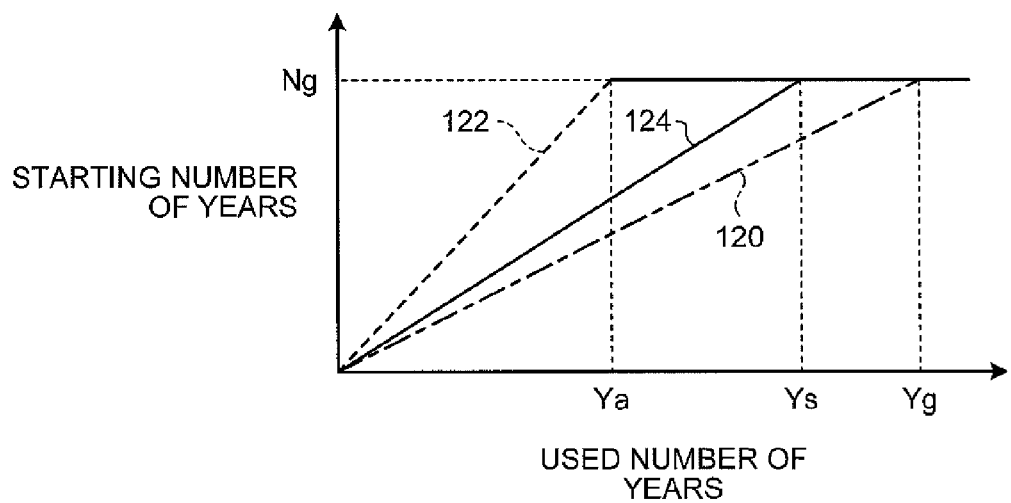
FIG. 6 is an explanatory view illustrating a relationship between a starting number of times and a used number of years of the engine when performing the economical running control in a vehicle control device according to a second embodiment.

FIG. 6 is an explanatory view illustrating a relationship between the starting number of times and the used number of years of the engine when performing the economical running control in the vehicle control device according to the second embodiment. If the vehicle 1 travels on the same road when the vehicle 1 travels on the road, the states of automatic stopping or automatic starting of the engine 4 by the economical running at the time of traveling also tend to become similar states. Thus, in the vehicle control device 2 according to the second embodiment, the stopped state of the engine 4 with respect to the road on which the vehicle is traveling is learnt by the economical running ECU 74, and in particular, the stopped state of the engine 4 at a road in which the traveling frequency is high is learnt. When limiting the automatic stopping of the engine 4 during traveling of the vehicle 1 based on the starting number of times and the used number of years of the engine 4, the automatic stopping is limited taking into consideration also such learnt stopped state of the engine 4 of when traveling on the road.

That is, in the vehicle control device 2 according to the second embodiment, when the number of years Ya at which the stop permitting starting number of times 122 reaches the guaranteed number of times Ng is determined to be shorter than the guaranteed number of years Yg, the automatic stopping of the engine 4 during traveling of the vehicle 1 is not merely prohibited, and the automatic stopping of the engine 4 is preferentially permitted in an area where the stopped time of the engine 4 is long. In other words, if determined that the traveling road is a road in which the stopped time of the engine 4 is relatively long according to the results learnt by the economical running ECU 74, the automatic stopping of the engine 4 traveling such location is permitted in a limited manner to reduce the fuel consumption amount.

In such a case, a learning starting number of times 124, which is the starting number of times of the engine 4 after the stopped state of the engine 4 is learnt, has a greater starting number of times than the stop prohibiting starting number of times 120, and thus a post-learning number of years Ys, which is the number of years for the learning starting number of times 124 to reach the guaranteed number of times Ng, becomes shorter than the guaranteed number of years Yg.

Figure 7:
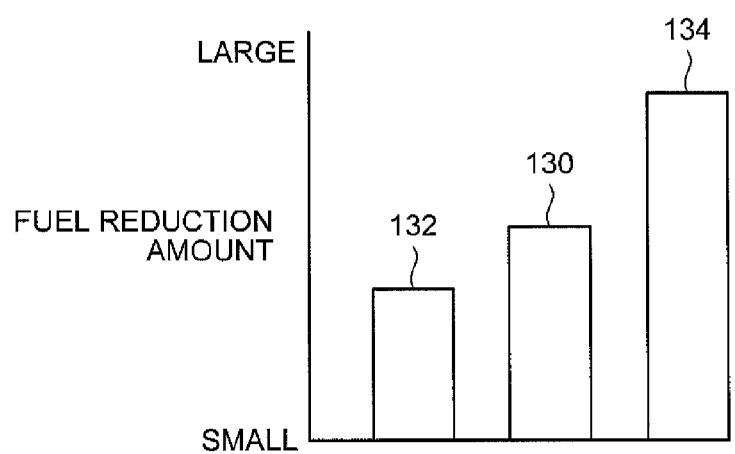
FIG. 7 is an explanatory view illustrating a fuel reduction amount for every stopped state of the engine at the time of economical running control.

FIG. 7 is an explanatory view illustrating a fuel reduction amount for every stopped state of the engine at the time of economical running control. When prohibiting the automatic stopping of the engine 4 during traveling of the vehicle 1 based on the starting number of times of the engine 4, the stop prohibiting used number of years Yprb becomes longer than the stop permitting used number of years Yper (see FIG. 4), and thus, the reduction amount of the fuel involved in stopping the engine 4 becomes large compared to when permitting the automatic stopping of the engine 4 during traveling if the number of years after elapse of the stop permitting used number of years Yper is also taken into consideration. That is, as illustrated in FIG. 7, a stop prohibiting reduction amount 130, which is the reduction amount of fuel of when prohibiting the automatic stopping of the engine 4 during traveling of the vehicle 1, becomes greater than a stop permitting reduction amount 132, which is the reduction amount of fuel of when permitting the automatic stopping of the engine 4 during traveling.

The usage period becomes longer, and consequently, the reduction amount of the fuel becomes larger if the automatic stopping of the engine 4 during traveling is prohibited, where the reduction amount of fuel becomes larger if the automatic stopping is permitted at an area where the stopped time of the engine 4 is long after learning the stopped state of the engine 4. That is, when the automatic stopping is permitted at an area where the stopped time of the engine 4 is long, the starting number of times increases compared to when the automatic starting during traveling is prohibited, and hence the usage period becomes short but the stopped time becomes long if the engine 4 is stopped by the automatic stopping in such a case, whereby the fuel consumption amount reduces. Therefore, a learning reduction amount 134, which is the fuel reduction amount in this case, becomes greater than the stop prohibiting reduction amount 130.

Figure 8:
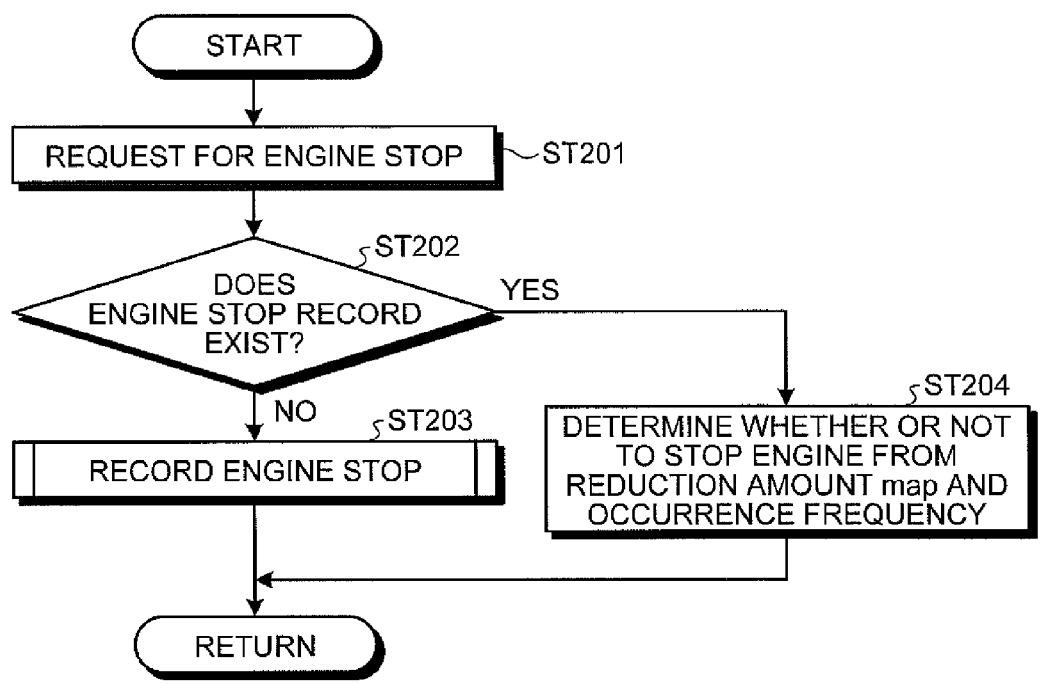
FIG. 8 is a flowchart illustrating an outline of a processing procedure of the vehicle control device according to the second embodiment.

FIG. 8 is a flowchart illustrating an outline of a processing procedure of the vehicle control device according to the second embodiment. The summary of the processing procedure of when learning the stopped state of the engine 4 and controlling in view the learnt state when performing the economical running control in the vehicle control device 2 according to the second embodiment will now be described. In the following processing procedure, the processing procedure of when a request for automatic stopping the engine 4 during traveling of the vehicle 1 is made will be described.

If the stopping request of the engine 4 is made when the predetermined conditions are satisfied during traveling of the vehicle 1 (step ST201), whether or not a stopping record of the engine 4 exists is determined (step ST202). That is, when performing the automatic stopping of the engine 4 by the economical running control, the economical running ECU 74 records the stopped state of the engine 4 in the traveling road in the storage unit of the economical running ECU 74. Specifically, when performing the automatic stopping of the engine 4, the state of stopping is recorded with the road information obtained by a car navigation system (not illustrated) mounted on the vehicle 1. Thus, when determining whether or not the stopping record of the engine 4 exists, whether or not the stopping record of the engine 4 of the road on which the vehicle is currently traveling exists is determined based on the road information obtained by the car navigation system.

If determined that the stopping record of the engine 4 does not exist according to such determination (step ST202, determination of No), an engine stop recording routine is executed next (step ST203).

Figure 9:
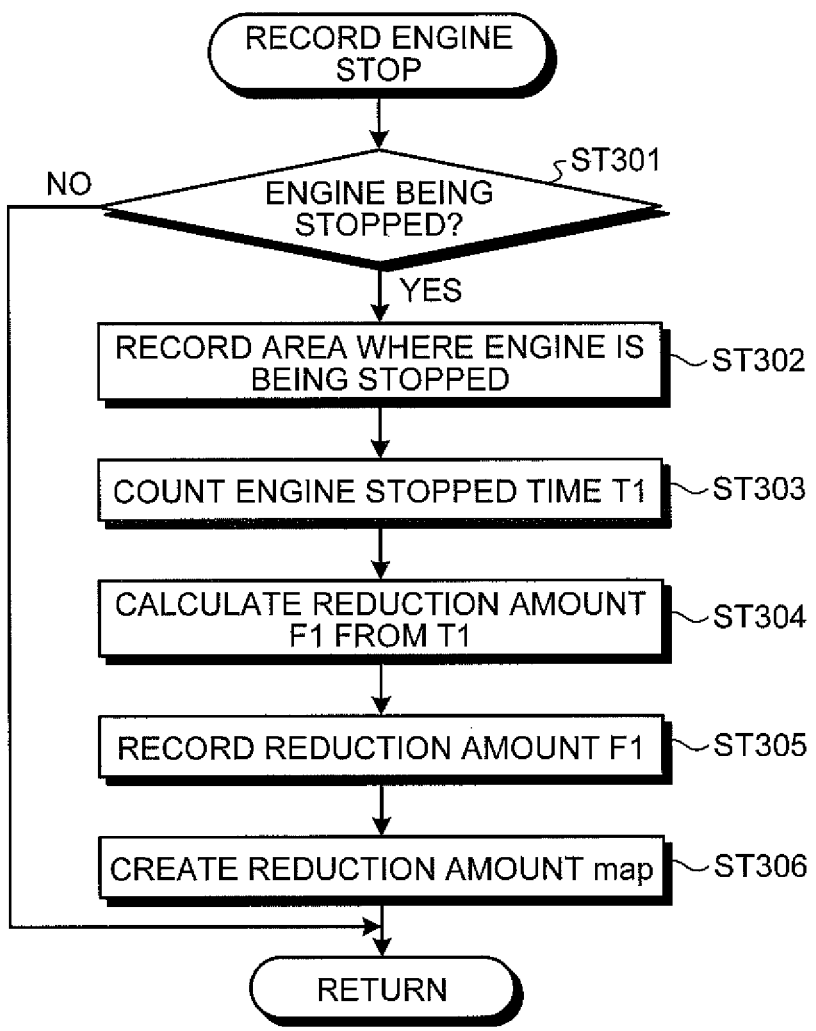
FIG. 9 is an explanatory view illustrating a processing procedure of an engine stop recording routine.

FIG. 9 is an explanatory view illustrating a processing procedure of the engine stop recording routine. In the engine stop recording routine, whether or not the engine 4 is stopping is determined first (ST301). If determined that the engine 4 is not stopping according to such determination (step ST301, determination of No), the process exits from the engine stop recording routine and returns to the original processing flow.

If determined that the engine 4 is stopping (step ST301, determination of Yes), on the other hand, the stopping area of the engine 4 is recorded (step ST302). In other words, the area where the engine 4 is stopping by the economical running control in the traveling road is recorded in the storage unit of the economical running ECU 74 by the road information obtained from the car navigation system.

An engine stopped time T1 is then counted (step ST303). That is, the engine stopped time T1, which is the time the engine 4 is stopping, continues to be counted while the engine 4 is stopping after the start of the automatic stopping of the engine 4.

The reduction amount F1 of fuel is then calculated from T1 (step ST304). This calculation is carried out by multiplying the fuel calculation amount per one second at the time of idling of the engine 4 and the engine stopped time T1, similar to when calculating the reduction amount of fuel based on the stopped time of the engine 4 (FIG. 5, step ST103), when determining the state of performing the automatic stopping of the engine 4. The reduction amount F1 of fuel in the engine stopped time T1 is thereby calculated.

After calculating the reduction amount F1 in such manner, such reduction amount F1 is recorded in the storage unit of the economical running ECU 74 (step ST305). Furthermore, the reduction amount F1 is associated with the traveling road, and the frequency of traveling such road is also combined to create a map of the reduction amount and record the same in the storage unit (step ST306). After creating the map of the reduction amount, the process exits from the engine stop recording routine and returns to the original processing flow.

The engine stop recording routine is executed if determined that the stopping record of the engine 4 does not exist (step ST202, determination of No), whereas the determination on whether or not to stop the engine 4 is made from the reduction amount map and the occurrence frequency (step ST204) if determined that the stopping record of the engine 4 exists (step ST202, determination of Yes).

Figure 10:
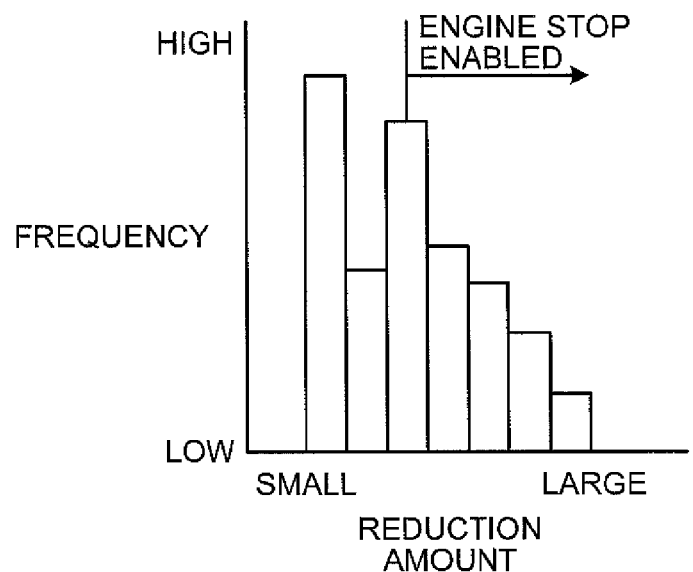
FIG. 10 is an explanatory view illustrating one example of a map used in determining whether or not to stop the engine.
Figure 11:
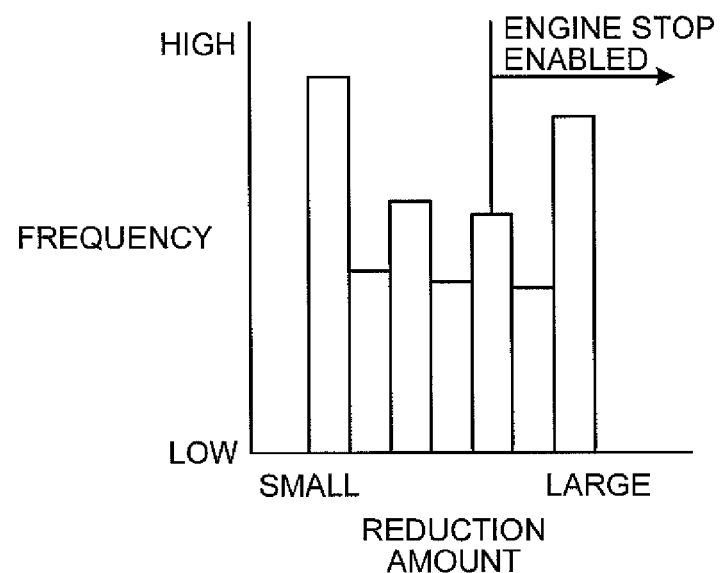
FIG. 11 is an explanatory view illustrating one example of a map used in determining whether or not to stop the engine.

FIG. 10 and FIG. 11 are explanatory views illustrating one example of a map used in determining whether or not to stop the engine. As illustrated in FIG. 10 and FIG. 11, the reduction amount map of the fuel is created as a map indicating a relationship of the frequency in which the opportunity to travel a predetermined road occurs during traveling of the vehicle 1, and the reduction amount of the fuel of when the automatic stopping of the engine 4 is performed at the time of traveling such road. When determining whether or not to stop the engine 4 using such map, the determination is made in view of both the occurrence frequency and the fuel reduction amount. For example, even if the reduction amount of the fuel is small overall, if there is an area where the frequency of performing the automatic stopping of the engine 4 is high, a portion where the reduction amount is greater than such area is assumed as a region to enable the stopping of the engine 4 (see FIG. 10). If an area where the frequency of performing the automatic stopping of the engine 4 is the same extent exists in plurals, a region of an area where the reduction amount of the fuel is large is assumed as a region to enable the stopping of the engine 4 (see FIG. 11).

When determining whether or not to stop the engine 4, determination to enable the stopping is made if the road on which the vehicle is currently traveling is positioned in a region of enabling the stopping of the engine 4 in the reduction amount map obtained from the car navigation system. Thus, if determination to enable the stopping of the engine 4 is made, the automatic stopping of the engine 4 is carried out according to the stopping supply of the engine 4 (step ST301). If the road on which the vehicle is currently traveling is not positioned in the region of enabling the stopping of the engine 4, on the other hand, the stopping of the engine 4 during traveling of the vehicle 1 is prohibited. Thus, the stopped state of the engine 4 by the economical running control is learnt, and the automatic stopping of the engine 4 is controlled in view of such learnt result.

The vehicle control device 2 described above learns the stopped state of the engine 4 when performing the economical running control, and permits the automatic stopping of the engine 4 in an area where the stopped time of the engine 4 becomes long even when limiting the automatic stopping of the engine 4 during traveling of the vehicle 1. Thus, in an area where the automatic stopping of the engine 4 is permitted to a limited extent, the engine 4 can be stopped for a long time, and hence the fuel economy can be more reliably improved by stopping the engine 4 by the permission of the automatic stopping. As a result, both the reduction of the fuel economy and the ensuring of the endurance of the starter 40 can be more reliably ensured.

In the vehicle control device 2 according to the second embodiment, the automatic stopping of the engine 4 during traveling of the vehicle 1 is limited based on the result of learning the stopped state of the engine 4, but the limitation of the automatic stopping may be carried out in view of the automatic stopping of the engine 4 during parking. That is, when prohibiting the automatic stopping of the engine 4 by the economical running control, the automatic stopping of shorter stopping period may be prohibited and the automatic stopping of longer stopping period may be permitted based on the result of learning the stopped state of the engine 4 of the automatic stopping during traveling and parking of the vehicle 1. When limiting the automatic stopping of the engine 4 based on the result of leaning the stopped state of the engine 4, determination is made in view of the automatic stopping of the engine 4 during parking to more appropriately perform prohibiting and permission of the automatic stopping, and the effect of improving the fuel economy can be more reliably ensured. As a result, the effect of reducing the fuel economy while ensuring the endurance of the starter 40 can be more reliably maintained.

In the vehicle control device 2 according to the second embodiment, the prohibiting state of the automatic stopping is determined based on the frequency of the automatic stopping and the reduction amount of the fuel of the engine 4 in the road on which the vehicle 1 is traveling, but the prohibiting state of the automatic stopping may be determined not only in the traveling road but also in the road on which the vehicle 1 is scheduled to travel. For example, among the automatic stopping of the engine 4 during traveling of the vehicle 1 and the automatic stopping of the engine 4 during parking, the automatic stopping with lower effect of fuel reduction may be limited in the road on which the vehicle 1 is scheduled to travel. Thus, the operation state of the engine 4 and the usage state of the starter 40 can be grasped in advance, and thus the travel control of the vehicle 1 can also be performed. As a result, the effect of reducing the fuel economy can be more reliably maintained while ensuring the endurance of the starter 40.

In the vehicle control device 2 described above, the automatic stopping of the engine 4 during traveling of the vehicle 1 is prohibited when regulating the stopping of the engine 4 by the economical running control, but the regulation of the stopping of the engine 4 may be carried out by prohibiting the automatic stopping of the engine 4 during parking. One of either the automatic stopping of the engine 4 during traveling of the vehicle 1 and the automatic stopping of the engine 4 during parking is prohibited to reduce the driving number of times of the starter 40 while maintaining the effect of improving the fuel economy by the economical running, and thus both the reduction of the fuel economy and the ensuring of the endurance of the starter 40 can be satisfied.

In the vehicle control device 2 described above, the automatic stopping of the engine 4 during traveling is limited based on the starting number of times and the used number of years of the engine 4, but the limitation of the automatic stopping may be carried out based on other than the above. In other words, the starting endurance ability of the engine 4 can be defined based on the endurance number of years of the engine 4, the starting number of times of the engine 4, the used time of the engine 4, and the like, and the limitation of the automatic stopping of the engine 4 can be more appropriately carried out by obtaining with the value capable of accurately defining the starting endurance ability among the above values. Thus, both the reduction of fuel economy and ensuring of the endurance of the starter 40 can be more reliably satisfied.

For a determination condition of stopping the engine 4 during traveling of the vehicle 1 and performing the economical running, the elapsed time from when the shift lever 60 is positioned at the neutral position, or the elapsed time from when the clutch 10 becomes the disconnected state may be further set with respect to the determination condition in the vehicle control device 2 described above. In this case, the elapsed time may be changed according to the traveling state of the vehicle 1, and the like, or may be arbitrarily changed by the driver 100. Alternatively, the determination for stopping the engine 4 may be made comprehensively from a vehicle speed, a disconnected time of the clutch 10, a neutral position holding time of the shift lever 60, a steering angle of the steering, and the like, or may be made by appropriately setting the determination condition.

Furthermore, in the vehicle control device 2 described above, the transmission 12 has a plurality of gear change stages having different change gear ratios, and is a manual transmission in which the driver 100 can manually select an arbitrary gear change stage, but the transmission 12 may be an automatic transmission. For example, a discontinuously variable automatic transmission of switching the change gear ratio using a planetary gear, a clutch and the like, or a continuously variable transmission of switching the change gear ratio in a stepless manner using a belt, a pulley, and the like may be adopted.

Thus, even if the transmission 12 is an automatic transmission, the transmission of torque can be shielded by disconnecting the clutch if the clutch is arranged between the engine 4 and the drive wheel 18, so that the economical running can be carried out. Furthermore, even if the transmission 12 is an automatic transmission, the driver 100 can arbitrarily switch the traveling range, and determination can be made that the driver 100 is not requesting for a driving force by having the traveling range in a N (neutral) range, which is a range in which the power generated by the engine 4 is not transmitted to the drive wheel 18, during traveling of the vehicle 1. Therefore, even if the transmission 12 is an automatic transmission such as a continuously variable transmission, and the like, the control shifts to the economical running control to limit the automatic stopping of the engine 4 if determination can be made that the driver 100 is not requesting for a driving force, so that both the reduction of the fuel economy and the ensuring of the endurance of the starter 40 can be satisfied.

REFERENCE SIGNS LIST

1 vehicle
2 vehicle control device
4 engine
10 clutch
12 transmission
32 alternator
36 battery
40 starter
42 power transmission mechanism
50 acceleration pedal
53 brake pedal
56 clutch pedal
60 shift lever
70 ECU
72 engine ECU
74 economical running ECU
100 driver
120 stop prohibiting starting number of times
122 stop permitting starting number of times
124 learning starting number of times

The invention claimed is:

1. A non-transitory recording medium comprising a program encoded and stored in a computer-readable format to cause a computer to execute a process including steps of:
   determining a starting endurance ability of an engine based on at least one of an endurance number of years of the engine, a starting number of times of the engine, and a used time of the engine;

calculating a cumulative number of times the engine has been started based on a sum of a number of times the engine has been started under the vehicle control during traveling of the vehicle and a number of times the engine has been started under the vehicle control during stopping of the vehicle;

calculating, based on the cumulative number of times the engine has been started, a first fuel reduction amount which is obtained by stopping the engine under the vehicle control during the traveling and a second fuel reduction amount which is obtained by stopping the engine under the vehicle control during the stopping;

comparing the first fuel reduction amount with the second fuel reduction amount;

limiting the stopping of the engine under the vehicle control during the traveling when determining that the first fuel reduction amount is less than the second fuel reduction amount; and limiting the stopping of the engine under the vehicle control during the stopping when determining that the second fuel reduction amount is less than the first fuel reduction amount, based on the determined starting endurance ability of the engine.

2. A non-transitory recording medium comprising a program encoded and stored in a computer-readable format to cause a computer to execute a process including steps of:

determining a starting endurance ability of an engine based on at least one of an endurance number of years of the engine, a starting number of times of the engine, and a used time of the engine;

calculating a cumulative number of times the engine has been started based on a sum of a number of times the engine has been started under the vehicle control during traveling of the vehicle and a number of times the engine has been started under the vehicle control during stopping of the vehicle;

calculating, based on the cumulative number of times the engine had been started, a first fuel reduction amount which is obtained by stopping the engine under the vehicle control during the traveling on a road on which the vehicle is scheduled to travel, and a second fuel reduction amount which is obtained by stopping the engine under the vehicle control during the stopping;

comparing the first fuel reduction amount with the second fuel reduction amount;

limiting the stopping of the engine under the vehicle control during the traveling when determining that the first fuel reduction amount is less than the second fuel reduction amount; and limiting the stopping of the engine under the vehicle control during the stopping when determining that the second fuel reduction amount is less than the first fuel reduction amount, based on the determined starting endurance ability of the engine.

3. A non-transitory recording medium comprising a program encoded and stored in a computer-readable format to cause a computer to execute a process including steps of:

determining a starting endurance ability of an engine based on at least one of an endurance number of years of the engine, a starting number of times of the engine, and a used time of the engine;

calculating a cumulative number of times the engine has been started based on a sum of a number of times the engine has been started under the vehicle control during traveling of the vehicle and a number of times the engine has been started under the vehicle control during stopping of the vehicle;

limiting the stopping of the engine under the vehicle control during the traveling when determining that the number of times the engine has been started under the vehicle control during traveling of the vehicle is less than the number of times the engine has been started under the vehicle control during stopping of the vehicle; and limiting the stopping of the engine under the vehicle control during the stopping when determining that the number of times the engine has been started under the vehicle control during stopping of the vehicle is less than the number of times the engine has been started under the vehicle control during traveling of the vehicle, based on the determined starting endurance ability of the engine.

* * * * *